United States Patent [19]

Ouellette

[11] Patent Number: 5,333,722
[45] Date of Patent: Aug. 2, 1994

[54] APPARATUS FOR DIVERTING A LANE OF SUCCESSIVE ARTICLES TO PLURAL LANES

[75] Inventor: Joseph F. Ouellette, Glendale, Mo.

[73] Assignee: Ouellette Machinery Systems, Inc., Fenton, Mo.

[21] Appl. No.: 975,873

[22] Filed: Nov. 13, 1992

[51] Int. Cl.$^5$ ............................................. B65G 37/00
[52] U.S. Cl. .................................. 198/436; 198/782; 198/790
[58] Field of Search ............... 198/372, 369, 437, 436, 198/790, 787, 782; 193/35 MD

[56] References Cited

U.S. PATENT DOCUMENTS

| 4,264,002 | 4/1981 | Van Der Schie | 198/365 |
| 4,372,435 | 2/1983 | Bradbury | 198/782 X |
| 4,792,034 | 12/1988 | Leemkuil | 198/372 |
| 4,913,277 | 4/1990 | Zrgiebel et al. | 198/782 X |
| 4,974,721 | 12/1990 | Born | 198/434 |
| 5,012,914 | 5/1991 | Berends et al. | 198/372 |
| 5,145,049 | 9/1992 | McClurkin | 198/782 X |

FOREIGN PATENT DOCUMENTS 211992  4/1967  Sweden ..................... 193/35 MD

Primary Examiner—Cheryl L. Gastineau
Attorney, Agent, or Firm—Rogers, Howell & Haferkamp

[57] ABSTRACT

A conveyor apparatus for supporting, conveying and diverting a lane of successive articles to supply four lanes so that the articles can be intermittently bunched in successive rows of four articles. The apparatus comprises a horizontal array of rollers arranged in transverse rows longitudinally spaced apart from one another. The rollers are rotatably driven about horizontal axes for providing upper rolling surfaces upon which the articles can be supported and conveyed. The rollers are operably pivotable about vertical axes for steering the articles across the array of rollers along the prescribed sharp-angled zig-zag paths.

22 Claims, 6 Drawing Sheets

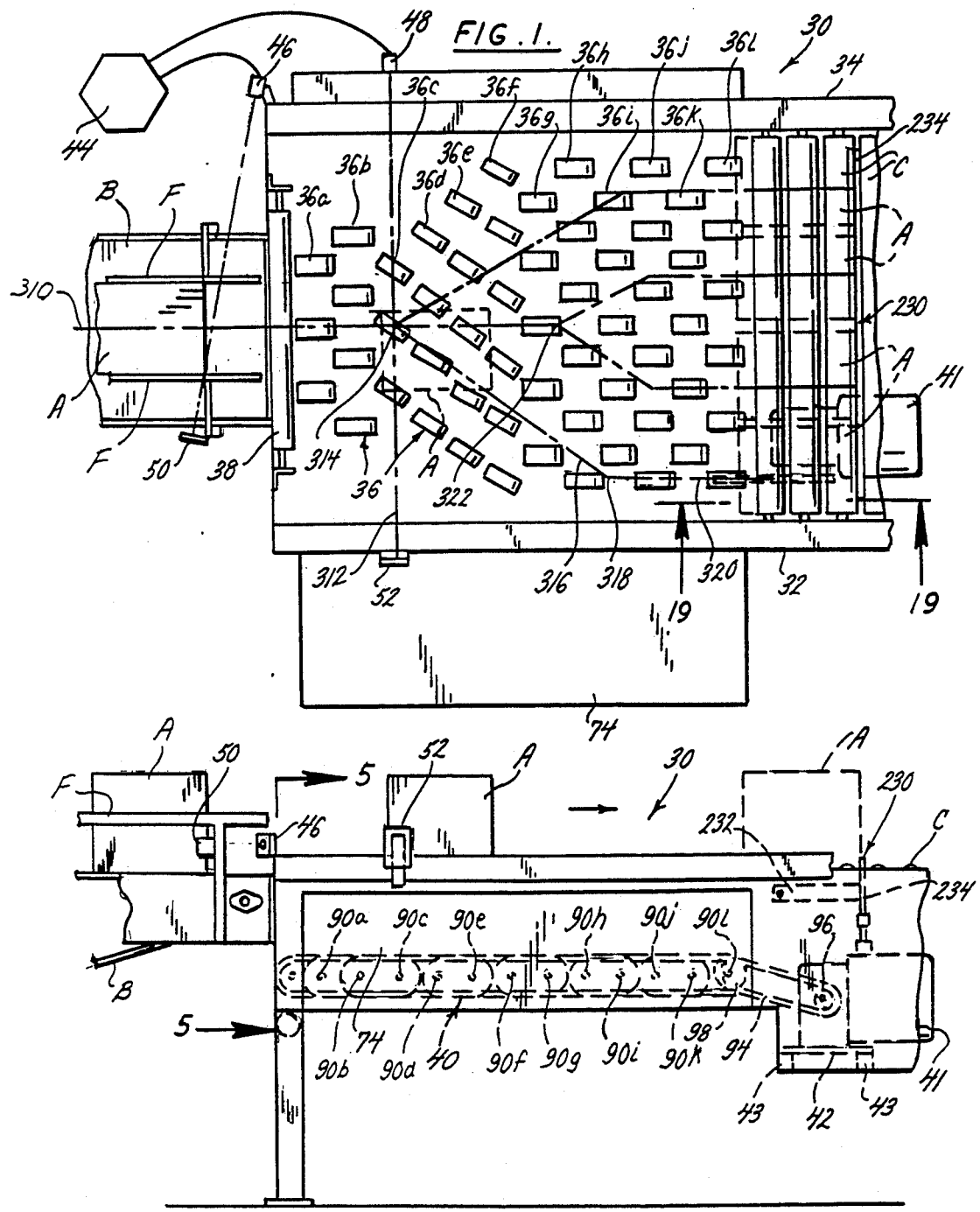

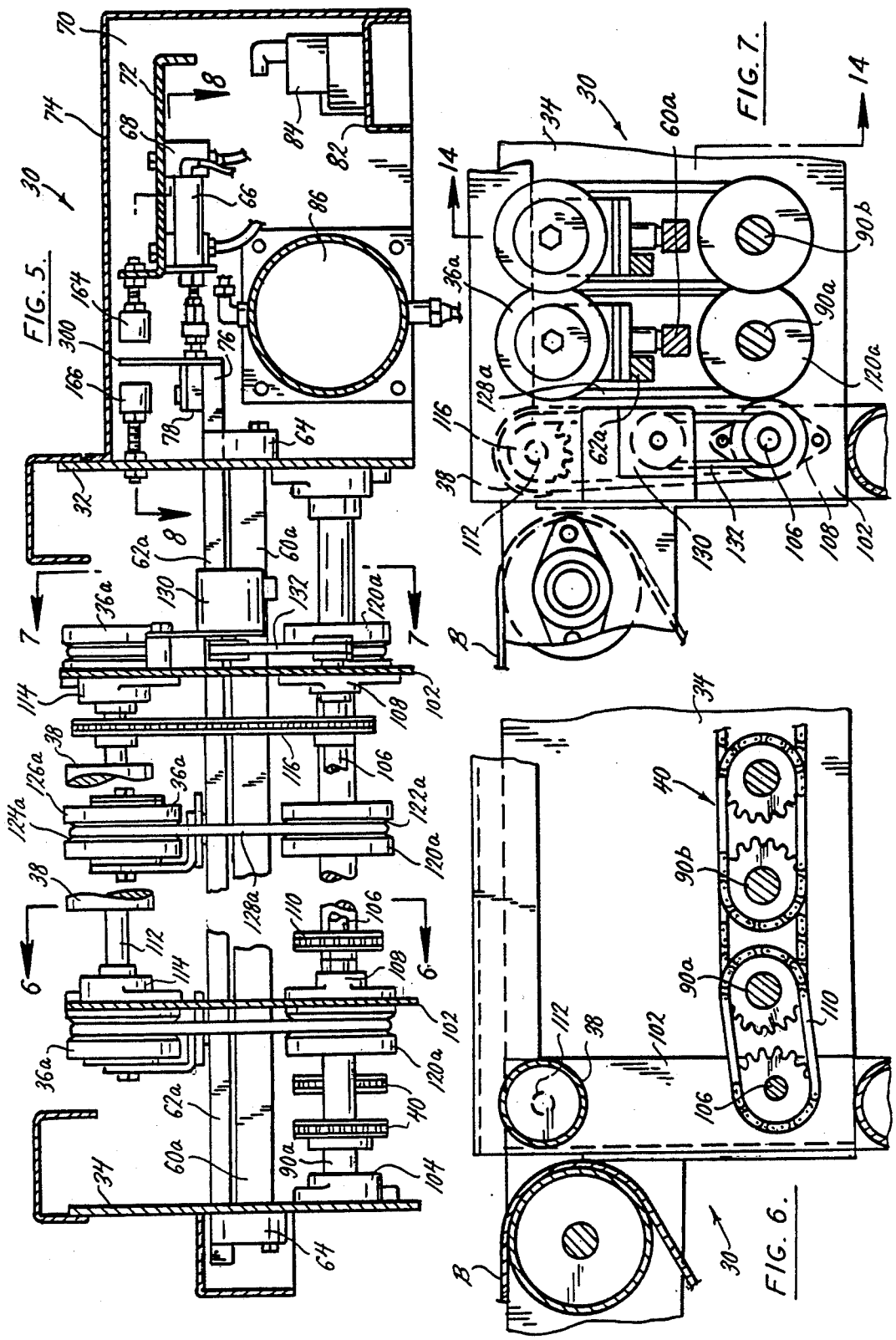

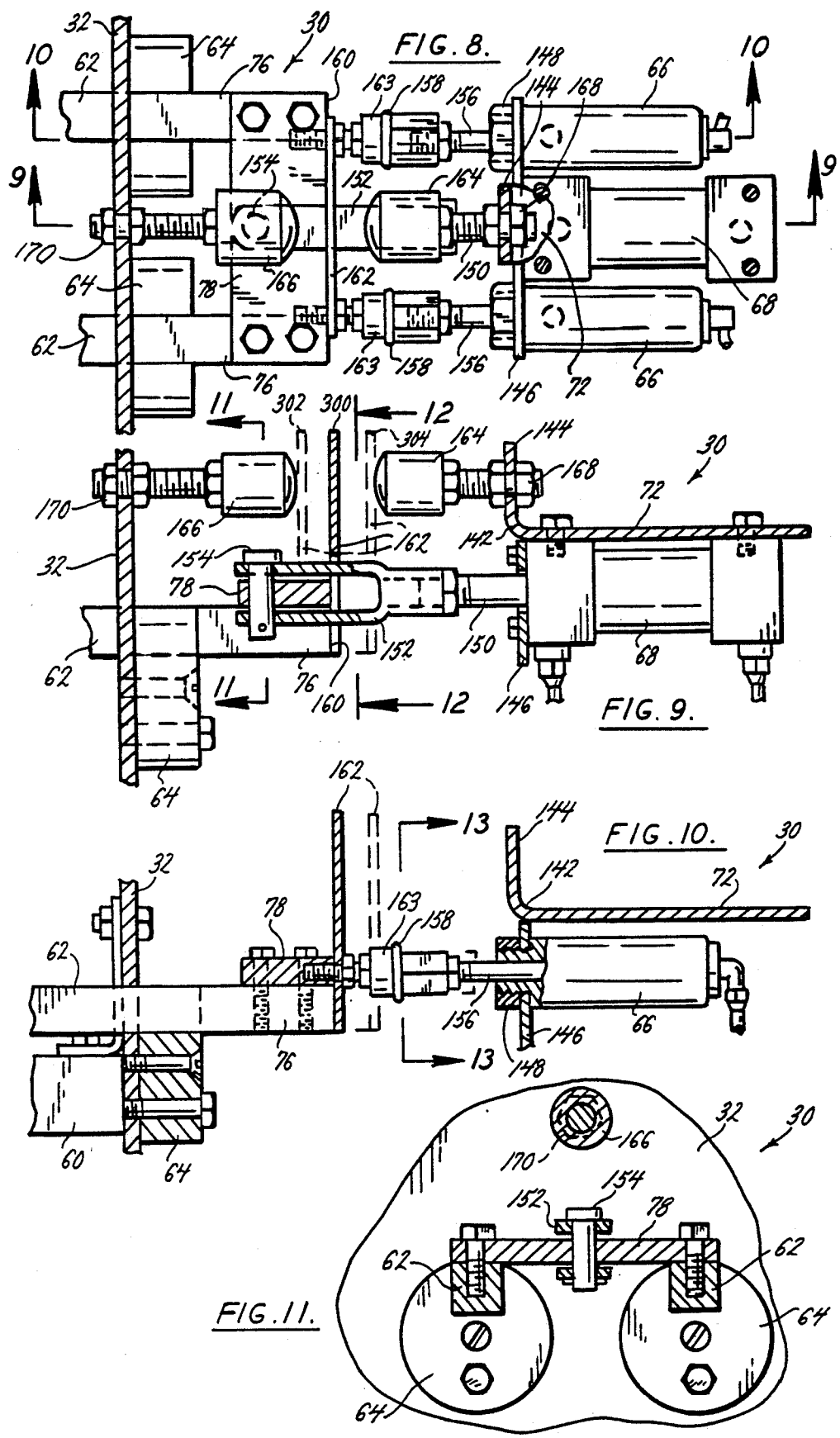

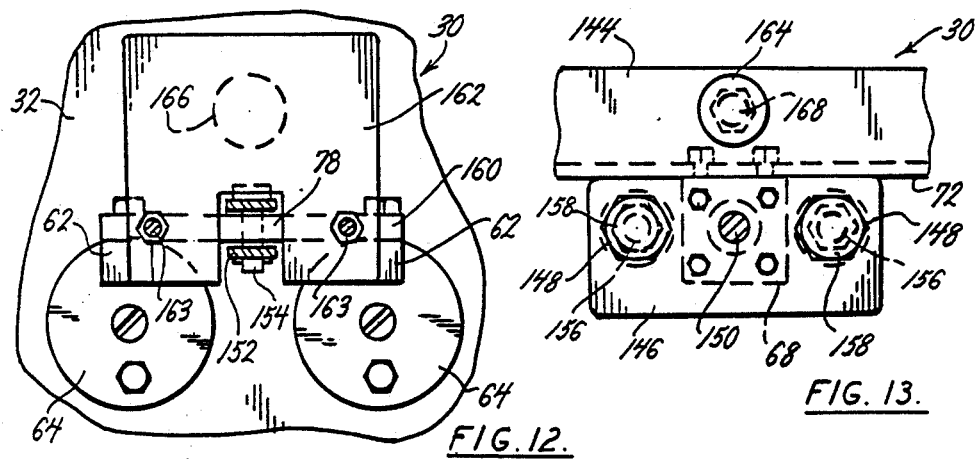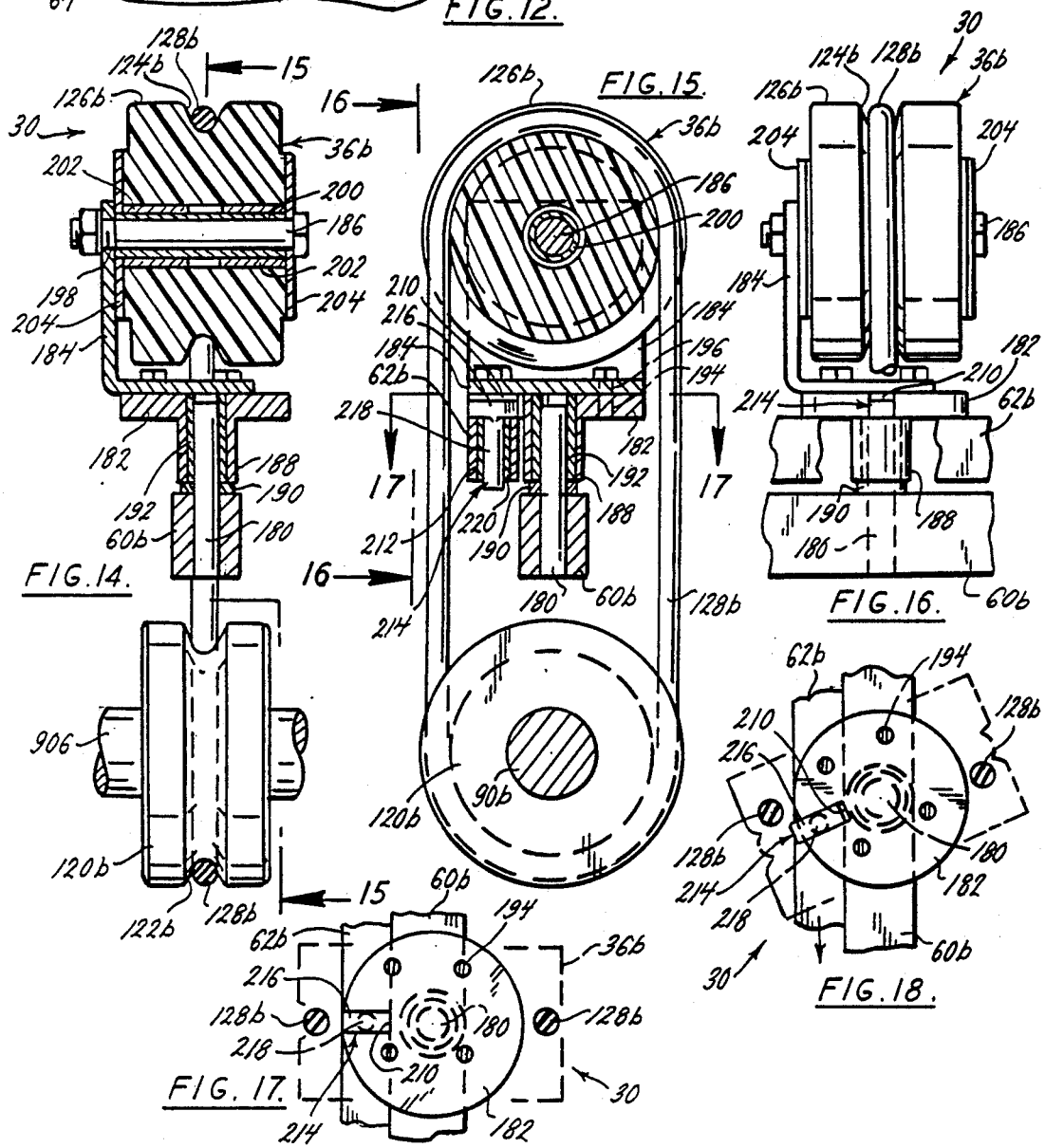

APPARATUS FOR DIVERTING A LANE OF SUCCESSIVE ARTICLES TO PLURAL LANES

BACKGROUND OF THE INVENTION

The present invention relates to an apparatus for supporting, conveying and steering articles, and more particularly to an apparatus for diverting a continuous succession of articles supplied in a single lane to supply plural lanes.

Apparatus for supporting, conveying and diverting articles are known in the art. The known apparatus typically is between an upstream conveyor and one or more downstream conveyors. The known apparatus is typically supplied by the upstream conveyor with a single column of a continuous succession of articles. The articles are supported, conveyed, and diverted by the known apparatus to supply plural columns of articles, as for supplying plural downstream conveyors and the like. For that purpose, the known apparatus typically comprises a horizontal section of rollers which are positively driven to rotate about horizontal axes and are operably pivotable about vertical axes. The rollers provide upper rolling surfaces upon which the articles can be supported and conveyed. In addition, the rollers are operatively pivotable from a normal position corresponding to conveying articles in a straight path to off-normal positions, corresponding to diverting articles.

The prior art apparatus are deficient at accurately steering the articles without such costly penalties as slowing down the throughput of articles or increasing the size and complexity of the apparatus. Steering accuracy is typically sacrificed when articles traveling at high speed approach rollers at an angle, even if the angle is shallow. Additionally, steering accuracy may be sacrificed when articles traveling at a moderate speed approach rollers at too severe an angle. Either way, the result is that traction is broken between the rollers and the articles. Consequently, the articles change travel directions in curved paths prescribed more by physics and inertia than by machine-selected control. To date, the preferred and conservative way to achieve steering accuracy is to slow down the throughput of articles. However, slowing down the throughput is costly for high-speed conveyor lines.

Further deficiencies in the prior art apparatus concern the longitudinal gaps required between successive articles. Gaps are costly because a high speed line with large gaps between successive articles provides only a low throughput of articles. Part of the need for gaps between successive articles relates to the time needed for repositioning the rollers between the passage of a leading article and the oncoming of a trailing article. Another need for gaps between successive articles relates to the sensitivity of the apparatus to the disordered supply of articles. Some of the prior art apparatus are especially sensitive to disordered supply such as the early arrival of a trailing article, because the apparatus has not had time to make a steering decision and position the rollers accordingly. Such articles then are steered in error. For such disordered supply, the typical solution has been to provide overgenerous gaps, and to suffer losses in throughput as a consequence.

What is needed to solve the deficiencies of the prior art is an apparatus which has a high throughput for articles, and which can steer articles at a sever angle without breaking traction between the rollers and the articles, as well as having the ability to make independent steering decisions on the basis of the arrival of each article, and which is rugged, compact, and long-lasting.

SUMMARY OF THE INVENTION

In accordance with the present invention, a diverter apparatus is provided for supporting, conveying and diverting a single lane of successive articles to a plurality of lanes so that the articles can be arranged bunched in successive moving rows each of a plurality of articles. The diverter apparatus sits between an upstream conveyor and a downstream conveyor. The upstream conveyor supplies the diverter apparatus with a continuous succession of articles in a single lane. The diverter apparatus supplies the downstream conveyor with a plurality of lanes of articles arranged in successive rows.

The diverter apparatus comprises a frame for supporting a horizontal array of rollers in position between the upstream and downstream conveyors. More particularly, the frame has opposite sidewalls for supporting a plurality of transverse bars. The transverse bars are longitudinally spaced apart. Each transverse bar supports a plurality of upstanding shafts, which are transversely spaced apart. The upstanding shafts have upper ends on which L-brackets are pivotally mounted. The L-brackets have vertical stems provided with bores for horizontally mounting axles. The horizontal axles have the rollers rotatably mounted thereon, the rollers providing rolling surfaces upon which the articles can be supported and conveyed.

Each roller is positively driven by a driving assembly. For that purpose, the frame supports a plurality of transverse shafts directly below the transverse bars that support the rollers. The transverse shafts are powered by a drive train which is powered by a single motor. Each shaft has a plurality of turning wheels fixed thereon, and each turning wheel is transversely aligned below a roller which is supported on a transverse bar. Each rollers has a circumferential groove recessed in its rolling surface, and each turning wheel likewise has a circumferential groove recessed in its circumference. For transferring power between the turning wheels and rollers, this diverter apparatus includes elastomeric round belting for friction drive therebetween.

Each roller is operably pivotable about a vertical axis through the upstanding shaft on which the L-bracket sits. For that purpose, this diverter apparatus comprises a plurality of transverse rods which are slidably supported at their opposite ends by cradles mounted on the opposite sides of the frame. These rods extend past the L-brackets of the rollers, and are interlinked eccentrically with the L-brackets so that translatory changes of position of a rod cause angular changes of position of the rollers in the corresponding row.

Each pair of rods is caused to slide by combinations of pneumatic actuators. The strokes of these pneumatic actuators can drive the rollers to pivot about thirty degrees to either side of normal positions.

For steering articles across the array of rollers, this diverter apparatus further comprises a controller for controlling the paths of articles along prescribed sharp-angled zig-zag paths. The functions of this controller include detecting the infeed of articles onto the array of rollers, pivoting each roller a position in line with the line of travel of each oncoming article, and selecting transverse rows of rollers at selected instants when a selected article is concurrently in rolling contact with the rolling surfaces of some of the rollers of those selected rows for the pivoting those rollers. Further, this controller pivots the rollers from first to second positions as to attain recoilless accuracy. The lack of recoil restricts fluttering, and so enables this diverter apparatus to steer the articles more accurately, and lessens the wear on the mechanical links for increasing the longevity of this diverter apparatus.

BRIEF DESCRIPTION OF THE DRAWINGS

Further objects and features of the present invention are revealed in the following detailed description of the preferred embodiment of the invention and in the drawing figures wherein:

FIG. 1 is a top plan view of the diverter apparatus of the present invention positioned between one operative an upstream conveyor for feeding a single lane of successive articles and a downstream conveyor for removing diverted articles;

FIG. 2 is a side elevational view of FIG. 1;

FIG. 5 is an enlarged sectional view partly broken away taken along the line 5—5 of FIG. 2;

FIG. 6 is a sectional view taken along the line 6—6 of FIG. 5;

FIG. 7 is a sectional view taken along the line 7—7 of FIG. 5;

FIG. 8 is an enlarged sectional view partly broken away taken along the offset line 8—8 of FIG. 5;

FIG. 9 is a sectional view partly broken away taken along the line 9—9 of FIG. 8;

FIG. 10 is a sectional view partly broken away taken along the line 10—10 of FIG. 8;

FIG. 11 is a sectional view taken along the line 11—11 of FIG. 9;

FIG. 12 is a sectional view taken along the line 12—12 of FIG. 9;

FIG. 13 is a sectional view taken along the line 13—13 of FIG. 10;

FIG. 14 is an enlarged sectional view taken along the offset line 14—14 of FIG. 7;

FIG. 15 is a sectional view taken along the offset line 15—15 of FIG. 14;

FIG. 16 is an elevation view in the direction of arrows 16—16 of FIG. 15;

FIG. 17 is a sectional view taken along the line 17—17 of FIG. 15, with the overhead roller shown in broken lines;

FIG. 18 is similar to FIG. 17 but shows the bracket and roller pivoted relative to FIG. 17.

DESCRIPTION OF THE PREFERRED EMBODIMENT

Figure 3:
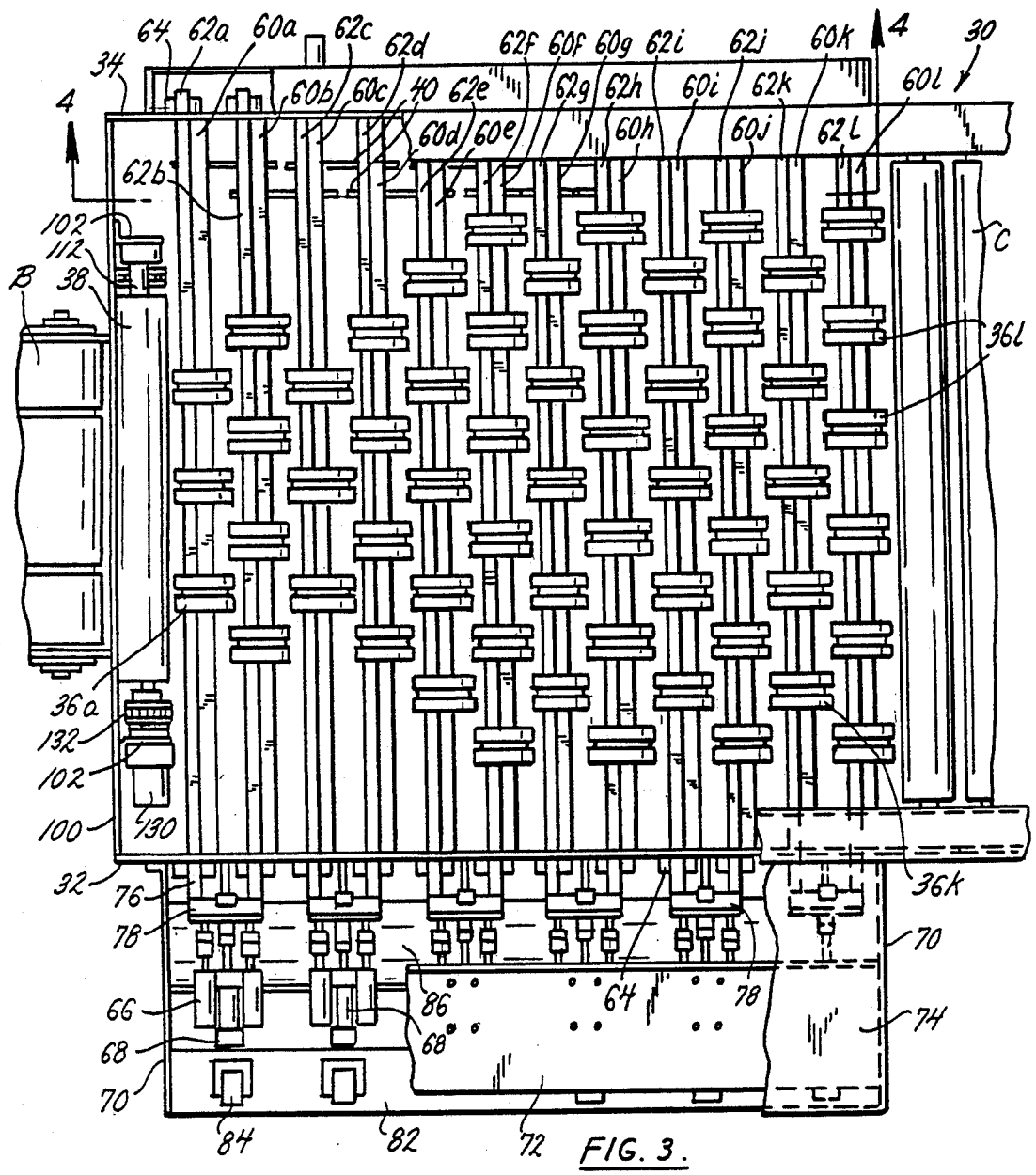
FIG. 3 is an enlarged top plan view partly broken away of the diverter apparatus.

FIGS. 1 and 2 show a diverter apparatus 30 of the present invention for supporting, conveying, and steering articles A. The articles A may be cardboard trays, cardboard cartons, or either of those two wrapped in plastic; or may be wooden containers, metal cans, brown paper bags such as for dog food, brown paper bags coated with vinyl, blocks of aluminum, and like. The diverter apparatus 30 is between an upstream conveyor B and a downstream conveyor C. The upstream conveyor B supplies the diverter apparatus 30 with a succession of articles A in a single lane. The diverter apparatus 30 supplies the downstream conveyor C with a plurality of lanes of articles, closely spaced, as shown in FIG. 1. For representative purposes the articles A are shown and described as having been diverted into four lanes supplied to the conveyor C.

The diverter apparatus 30 comprises a frame which includes a proximal side wall 32 and an opposite distal side wall 34. The diverter apparatus 30 further comprises a multiplicity of rollers 36 and an elongated roller 38, all mounted for rotation about horizontal axes. The rollers 36 and elongated roller 38 provide rolling surfaces upon which articles A can be supported and conveyed. For long life and traction on such articles A as cardboard cartons, the rollers 36 are made of such suitable material as polyvinylchloride. Yet it is also common in the art to make the rollers 36 of such other materials as brass, aluminum, stainless steel, and the like. The rollers 36 and elongated roller 38 are all positively driven by a drive train 40 powered by a power source such as a single motor 41. The motor 41 is supported on a mounting plate 42, and the mounting plate 42 in turn is supported on a pair of rectangular tubes 43 that extend between and are supported by the opposite walls 32 and 34. For steering the articles A, each roller 36 of this diverter apparatus 30 is pivotable about a vertical axis as shown in FIG. 1 and as will be described.

This diverter apparatus 30 further still comprises a controller 44 for detecting the infeed of articles A onto the diverter apparatus 30, and then for pivoting the rollers 36 for steering the articles A along prescribed paths. The controller 44 may be an AEG Modicon Factory Mate Plus or the like. For detecting the infeed of articles A, this controller 44 is electrically connected to a first photodetector 46 and a second photodetector 48. Each photodetector 46 and 48 is mounted on the distal wall 34 and is of a standard variety which combines an emitter and receiver in the same unit. To complement each photodetector 46 and 48, there are also a first reflector 50 and a second reflector 52 mounted opposite of the respective photodetectors 46 and 48.

FIG. 3 more particularly shows that the multiplicity of rollers 36 are arranged in a horizontal array. The rollers 36 are shown to be arranged in twelve transverse rows. For supporting a transverse row of rollers 36 from below, the side rails 32 and 34 support the opposite ends of a plurality of transverse bars 60 (twelve bars 60a-60l). The transverse bars 60 are longitudinally spaced apart as shown. The first transverse bar 60a (first to last as viewed in FIG. 3 is from left to right) is longitudinally spaced from as well as lower than the elongated roller 38 (see FIG. 5). Those rollers 36 which are in adjacent transverse rows are alternately laterally staggered from one another. The first and third transverse rows 60a and 60c comprise three rollers 36. The second and fourth transverse rows 60b and 60d comprise four transverse rollers. Thereafter, odd-numbered transverse rows 60e, 60g, 60i, and 60k comprise five rollers 36, and even-numbered transverse rows 60f, 60h, 60j and 60l comprise six rollers 36.

For steering the articles A, this diverter apparatus 30 comprises a steering assembly which includes twelve transverse rods 62. The transverse rods 62 are transversely longer than the spacing between the side walls 32 and 34. To support the transverse rods 62, the side walls 32 and 34 each support twelve cradles 64 (see FIG. 5). Each cradle 64 on the proximal side wall 32 has a counterpart cradle 64 on the distal side wall 34 for cooperatively supporting one of the twelve rods 62 for translatory movement while cradled. For imparting translatory movement to the rod 62, the steering assembly further comprises twelve 1 1/16-inch pneumatic actuators 66 and six 1⅛-inch pneumatic actuators 68. For mounting the pneumatic actuators 66 and 68, the diverter apparatus 30 further comprises a pair of opposite brackets 70 mounted on the proximal side wall 32. The opposite brackets 70 support a mounting plate 72 which is spaced apart from the proximal wall 32, and a cover plate 74 above the mounting plate 72.

As shown in FIG. 8, each of the transverse rods 62 has a proximal end 76 projecting toward the mounting plate 72, and the proximal ends 76 of adjacent pairs of rods 62 are joined by a link plate 78. Each link plate 78 thus yokes adjacent pairs of transverse rods 62 to move in tandem.

This diverter apparatus 30 further comprises a mounting rail 82 (FIGS. 3 and 5) which extends between the opposite side brackets 70 at an elevation lower than the mounting plate 72. The mounting rail 82 supports six banks of electrically operated pneumatic valves 84, where each bank comprises two valves (not illustrated). The pneumatic valves 84 are electrically connected to the controller 44 by wires (not shown but well-known in the art). Likewise, the pneumatic valves 84 are pneumatically connected to the pneumatic actuators 66 and 68 by flexible hoses (not shown but also well-known in the art). The pneumatic valves 84 are immediately supplied air by an accumulator 86, which in turn is supplied air by an air line (not shown) from an air source (not shown) of the type that is well-known in the art.

Figure 4:
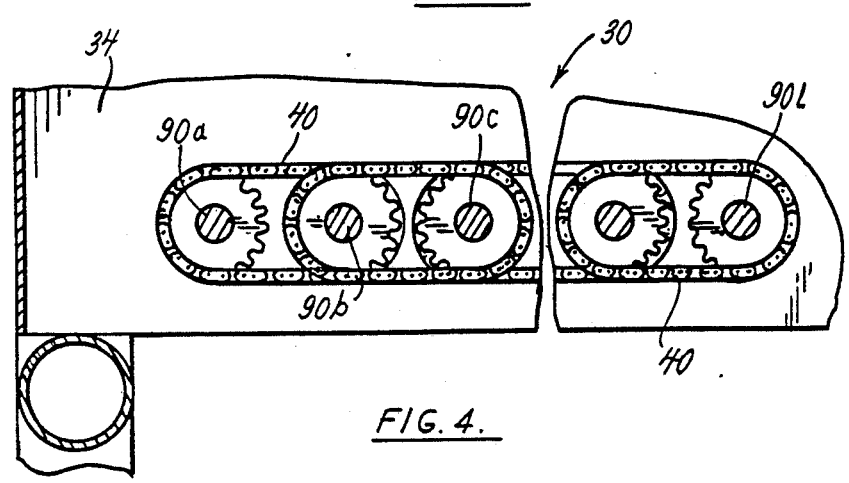
FIG. 4 is an enlarged sectional view partly broken away taken along the line 4—4 of FIG. 3.

FIG. 4 shows a representative few of twelve transverse shafts 90 which are directly below the transverse bars 60 (see FIGS. 5 and 7). The transverse shafts 90 are rotatably mounted at their ends to the opposite side walls 32 and 34. FIG. 4 also shows how adjacent transverse shafts 90 transfer power between one another, as by the slaving of chain and sprocket drives of the drive train 40. Referring back to FIG. 2, the motor 41 supplies power to the drive train 40 by means of a chain 94 and sprocket 96. The chain 94 drives a sprocket 98 on the proximal end of the last transverse shaft 90l.

Back in FIG. 3, the frame of the diverter assembly 30 is shown to further comprise a front wall 100 which is supported by and extends between the front edges of the side walls 32 and 34. The front wall 100 supports a pair of opposite brackets 102 for rotatably mounting the elongated roller 38. FIG. 5 shows that the first transverse shaft 90a, as representative of the others, is rotatably mounted at its opposite ends by bearings 104 that are supported by the side walls 32 and 34. FIG. 6 shows the drive train 40 to extend to a thirteenth transverse shaft 106 positioned under the elongated roller 38. FIG. 5 shows the thirteenth transverse shaft 106 to be rotatably mounted at its opposite ends by bearings 108 supported by the opposite side brackets 102. The drive train 40 is operably connected (via a sprocket wheel) to the distal end of the transverse shaft 90a. FIGS. 5 and 6 show the transfer of power from the drive train 40 to the thirteenth transverse shaft 106 as transferred by the chain and sprockets 110.

As shown in FIG. 5, the elongated roller 38 has opposite ends formed as oppositely projecting axle stubs 112. The axle stubs 112 are rotatably mounted in bearings 114, which are supported by the opposite side brackets 102. FIGS. 5 and 7 show the elongated roller 38 to be driven by the thirteenth transverse shaft 106 by the chain and sprockets 116.

FIGS. 5 and 7 show the rollers 36a of the first transverse row, as representative of all the other rollers 36, to be powered by the transverse shaft 90a, which is directly below the rollers 36a, as follows. The transverse shaft 90a has three driving wheels 120a mounted for fixed rotation with the transverse shaft 90a. The driving wheels 120a are transversely spaced apart in corresponding alignment directly below the three rollers 36a of the first transverse row. Each driving wheel 120a has a circumferential groove 122a recessed in its circumferential surface. Correspondingly, each roller 36a a has a similar circumferential groove 124a recessed in its rolling surface 126a. Power is transferred between the first transverse shaft 90a and the three rollers 36a of the first transverse row by three elastomeric bands 128a, which may be Eagle brand round urethane belting or the like, looped around the respective grooves 122a and 124a for friction drive transmission.

By all these power transfers, the motor 41 positively drives the rollers 36 and elongated roller 38 at prescribed speeds, preferably the same among them all. Since the speed of the rollers 36 and elongated roller 38 is a desirable data input for the controller 44, the diverter apparatus 30 comprises a shaft encoder 130 (see FIGS. 5 and 7). The shaft encoder 130 is mounted on the proximal one of the opposite side brackets 102, and is driven by a toothed-belt drive 132 operably connected to the thirteenth transverse shaft 106, which projects through the proximal one of the opposite side brackets 102, as shown.

FIGS. 8, 9, 10, 11, 12 and 13 more particularly show the operable connection between the pneumatic actuators 66 and 68 and the translatory rods 62. As said, pairs of adjacent rods 62 are fixedly linked at their proximal ends 76 by a linking plate 78. FIG. 8 is representative of all six pairs of transverse rods 62 so linked. Each linking plate 78 is imparted with translatory motion by a combination of one 1⅛-inch cylinder 68 and two 1 1/16-inch cylinders 66.

FIGS. 8 and 9 show the 1⅛-inch cylinder 68 to be bolted to the mounting plate 72, and therefore mounted in fixed relative spacing from the proximal side wall 32. The mounting plate 72 has a proximal edge 142 bent to form an upstanding flange 144. The head of the 1⅛-inch cylinder 68 supports a depending flange 146 below the proximal edge 142 (FIGS. 9 and 13). The 1 1/16-inch cylinders 66 flank the 1⅛- cylinder 68 and are mounted by head bolts 148 to the depending flange 146. Thus, the 1 1/16-inch cylinders 66 are also fixed in relative spacing from the proximal side wall 32. The 1⅛-inch cylinder 68 has a reciprocating piston rod 150 that terminates in a threaded connection with a clevis 152. The clevis 152 is fixedly mounted to the link plate 78 by a pin 154.

The 1 1/16-inch cylinders 66 likewise have reciprocating piston rods 156, which terminate in threaded connections with urethane cushion pads 158. For cooperating therewith, the link plate 78 has a proximal edge 160, to which is bolted an upstanding bumper plate 162 by bolts with protruding bolt heads 163 that function as stops. The stops 163 are positioned for engagements with the cushion pads 158 of the 1 1/16-inch cylinders 66.

The upstanding bumper plate 162 has an opening cut therethrough to permit the clevis 152 to reciprocate as shown in FIG. 9. The upstanding bumper plate 162 projects upwardly between a proximal rubber stop 164 and an opposite distal rubber stop 166. The proximal rubber stop 164 is held in position by a bolted connection 168 with the upstanding flange 144. Similarly, the distal rubber stop 166 is held in position by a bolted connection 170 with the proximal side wall 32. FIG. 12 shows the rubber stop 166 to be targeted at about the middle of the upstanding bumper plate 162.

FIGS. 14, 15, 16, 17 and 18 more particularly show the support and operable connections of one roller 36b of the four of the second transverse row, as representative of all the rollers 36. The major components which support the roller 36b include an upstanding shaft 180, a turntable 182, an L-bracket 184, and an axle 186. The shaft 180 has a lower end fixed in a bore through the transverse bar 60b as shown. The turntable 182 has a depending ring portion 188 defining a tubular access for receiving the upper end of the shaft 180. The ring portion 188 has a lower end sitting on a washer 190, and the washer 190 sits on the transverse bar 60b. The ring portion 188 is further provided with a bushing 192 between the ring portion 188 and the upper end of the shaft 180.

The turntable 182 has threaded bores 194 recessed in its upper surface. The L-bracket 184 has its foot portion provided with correspondingly arranged bores 196, so that the L-bracket 184 may be bolted to the turntable 182 as shown. The L-bracket 184 has an upstanding stem portion that has a through bore 198 for mounting the axle 186. The axle 186 may be a bolt for gripping between its bolt head and nut such an assembly that comprises an inner sleeve 200, opposite bushing halves 202, and opposite ring washers 204 as well as the roller 36b and L-bracket 184, as shown.

FIGS. 15, 17 and 18 show the manner of linkage between the turntable 182 and transverse rod 62b. The turntable 182 has a rectangular keyway 210 recessed through its circumferential edge. FIG. 15 shows the transverse rod 62b to have a correspondingly aligned bore 212 recessed through its top surface. The turntable 182 and transverse rod 62b are interconnected by virtue of a key 214. The key 214 has a rectangular head and a cylindrical stem 218 depending from a rectangular head 216. The cylindrical stem 218 is pivotally received by the bore 212 in the rod 62b, with a bushing 220 intercommunicating therebetween. The rectangular head 216 is slidably received in the rectangular keyway 210 of the turntable 182, as shown slidably moved radially in FIG. 18 relative to the position shown in FIG. 17.

Figure 19:
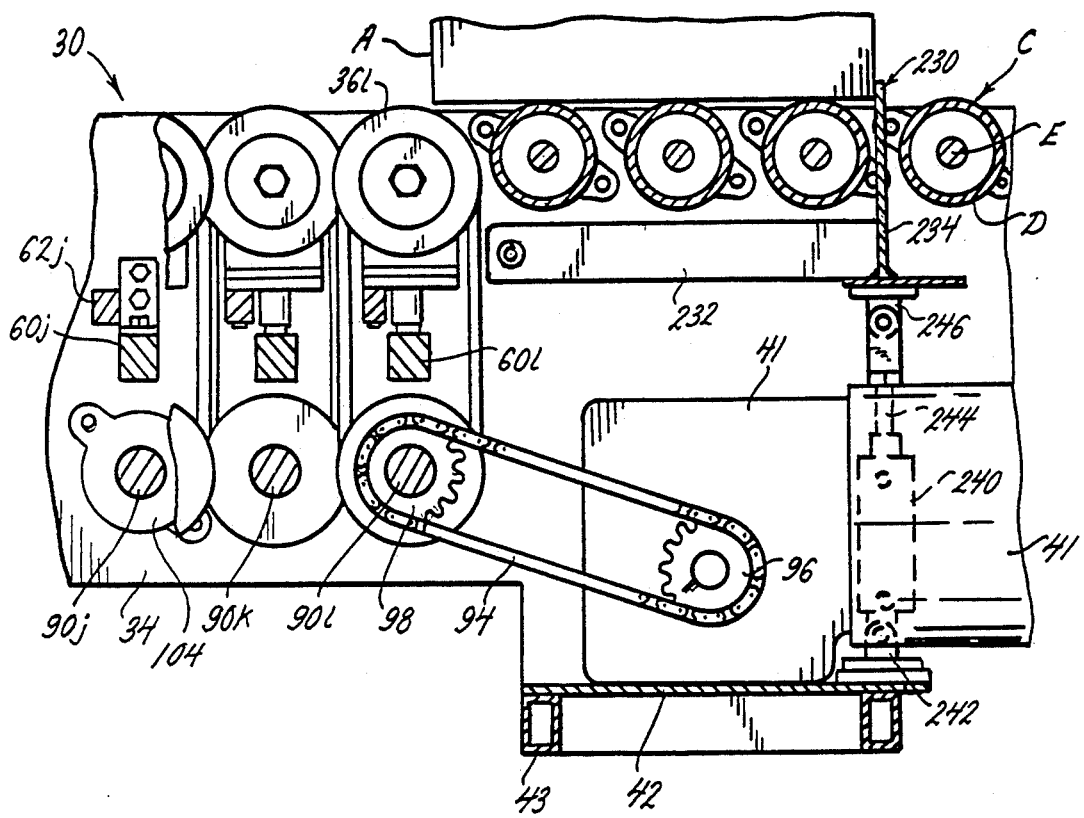
FIG. 19 is an enlarged sectional view taken along the line 19—19 of FIG. 1.

FIG. 19 shows the downstream conveyor C to comprise a retractable stop gate assembly 230. Generally speaking, the downstream conveyor C comprises a plurality of driven rollers D rotatably mounted on a plurality of transverse shafts E supported by opposite, transversely spaced side walls, which may be continuations of the side walls 32 and 34 of the diverter apparatus 30 (FIGS. 1 and 3). The driven cylinders D are powered by a power train and power source which are not illustrated but are well-known in the art.

The retractable stop gate assembly 230 comprises a pivot arm 232 pivotally connected at one end to the distal side wall 34 (with an opposite counterpart, not established, pivotally mounted to the proximal side wall 32). The opposite end of the pivot arm 232 is fixedly connected to an upstanding stop bar 234, which extends transversely between the opposite side walls 32 and 34 (FIG. 1) but without engagement with either.

The retractable stop gate assembly 230 further comprises a pneumatic cylinder 240 which is upright. The pneumatic cylinder has a lower end pivotally connected to a bracket 242 that is fixedly connected to the motor mounting plate 42. The pneumatic cylinder 240 has a piston rod 244 which reciprocates in a generally vertical axis, and terminates in an upper end pivotally connected to a bracket assembly 246. The bracket assembly 246 is fixed to the stop bar 234 and is positioned about midway between the opposite ends of the stop bar 234. The pneumatic cylinder 240 is operably connected by rubber hoses (not illustrated) to an electrically operated pneumatic valve (also not illustrated), which in turn is operated by the controller 44.

OPERATION AND USE

FIGS. 1 and 2 show the diverter apparatus 30 supporting, conveying and steering articles A across the rolling surfaces 126 (FIGS. 5 and 14) of the array of rollers 36 in the direction from left to right. The diverter apparatus 30 is supplied a single lane of a succession of articles A by the upstream conveyor B. The upstream conveyor B supplies the articles A in a single lane by means well-known in the art such as guide rails F or the like. Further, the upstream conveyor B can (though not illustrated) supply the articles A either in abutting succession or in succession with measured gaps between adjacent articles.

Belting devices that successively provide measured gaps between adjacent articles are old and well-known in the art. These belting devices are sometimes known as metering belts, or might also be known as break-and-hold-back belting devices. A known metering belt device (or however it may be known) could be selected to be installed in the conveyor line shown in FIGS. 1, 2 and 3 (the known metering belt device is not illustrated), as installed between the upstream conveyor belt B and the diverter apparatus 30. If that were done, then successive articles A could be supplied to the diverter apparatus 30 not in abutting succession but in succession with gaps between adjacent articles A. And so a choice can be made. The diverter apparatus 30 works well enough while supplied articles A merely in abutting succession. But the diverter apparatus 30 can deliver a higher throughput of articles A with very reasonable steering accuracy if supplied successive articles A with measured gaps, as a known metering belt device would provide. The choice thus depends on whether it is preferred to avoid the cost of a metering belt device or whether it is preferred to maximize throughput. What follows is a description of the use and operation of the diverter apparatus 30 as supplied articles A in abutting succession, but it would be within the means of one ordinarily skilled in the art to adopt this description for an infeed of articles A from a metering belt.

When an article A arrives at the elongated roller 38 the elongated roller 38 increases the speed of travel of the article A relative to speed of articles on the upstream conveyor B. For example, a typical speed of travel for articles on the upstream conveyor may be 100 feet per minute, while the speed of travel for articles A across the rollers 36 can be 150 feet per minute. The elongated roller 38, while turning at a rate corresponding to the speed for articles A of 150 feet per minute, causes the acceleration of articles A as the articles A travel across the roller 38.

FIGS. 5 and 7 show the elongated roller 38 to have an uppermost elevation planar with the uppermost elevations of the rollers 36. The bearings 114 supporting the elongated roller 38 are mounted to the opposite side brackets 102 so as to permit changes in the uppermost elevation of the elongated roller 38, for adjusting it level with the rollers 36. As an example, the side brackets 102 can have vertically extending slotted openings for receiving bolts that tighten the bearings 114 thereto.

The elongated roller 38, however, has an uppermost elevation higher than the uppermost elevation of the upstream conveyor belt B. If the elongated roller 38 is mounted slightly higher than the upstream conveyor B, then the articles A must "climb up" the elongated roller 38 when their leading edges arrive at the elongated roller 38. The articles A keep "climbing" until their centers of gravity cross the elongated roller 38, after which the articles A will fall until supported level by the elongated roller 38 and rollers 36. The elongated roller 38 has a slick surface, which can be made that way by machining. Thus the elongated roller 38 provides little traction. But once traction is established between the rollers 36 and the articles A, the articles A thereafter travel at the speed of the rolling surfaces 126a.

The elongated roller 38 therefore is a low but intentionally placed "hurdle" for the articles A to "climb" for the purpose of preventing the simultaneous gripping of the article A by the upstream conveyor B and the rollers 36a of the first transverse row. The elongated roller 38 thus functions to decrease the wear of the rolling surfaces 126a of the rollers 36a.

The speed-up of the articles A tends to put or increase the longitudinal spacing between adjacent articles A while traveling across the diverter apparatus 30 (longitudinally forward is left to right in FIGS. 1 and 2). If, for example, the articles are twelve inches long, the speed-up of the articles A from 100 feet per minute to 150 feet per minute tends to put or increase the longitudinal gap between adjacent articles A at about 6 inches.

Once on the diverter apparatus 30, the articles A are supported, conveyed and diverted to supply the retractable stop gate assembly 230 with a plurality of lanes (such as four lanes) of articles A. Alternatively, the diverter apparatus 30 could supply four conveyor belts (not illustrated). The retractable stop gate assembly 230 operates intermittently to both collect a transverse row of four articles A and to pass successive rows onward down the downstream conveyor C. The downstream conveyor C typically is set to convey the articles A at a travel rate equivalent to that of the diverter apparatus 30. Much further downstream, the travel rate of the downstream conveyor C can be reduced by a factor of four or so.

The controller 44 operably steers, or more accurately "directs", the articles A across the array of rollers 36 along prescribed, and controllable, sharp-angled zig-zag paths. Generally speaking, the functions of the controller 44 include detecting the infeed of articles A onto the array of rollers 36, reading the shaft encoder 130 (FIG. 5) for computing the progressive positions of the articles A along the array of rollers 36, and then making decisions for operating each two air valves of the air valve banks 84 at predetermined and coinciding moments according to one of four programmed subroutines corresponding to lane diverting to one of four lanes. In consequence, operating the air valves 84 causes translatory changes of position in the proximal ends 76 of the rods 62. As a further result, translatory changes of positions in the rods 62 cause angular changes of position in the turntables 182. As a final result, the rollers 36 are operably pivotable about vertical axes disposed through the upstanding shafts 180.

More particularly, FIGS. 8 and 9 show that the pneumatic cylinders 66 and 68 impel the proximal ends 76 of the transverse rods 62 among three operable positions. The normal position 300 is illustrated by the bumper plate 162 as drawn in solid lines. The distal position 302 is illustrated by the bumper plate 162 as drawn in broken lines and to the left of the normal position 300. The distal position 302 has an opposite counterpart, the proximal position 304, also drawn in broken lines.

The normal position 300 of the bumper plate 162 is held firmly by virtue of the two 1 1/16-inch cylinders 66 pushing against the pull of the 1⅛-inch cylinder 68. FIGS. 8 and 9 show the 1 1/16-inch cylinders 66 driven to full extension. Conversely, the 1⅛-inch cylinder 68, pneumatically connected for double action, is shown in FIGS. 8 and 9 driven to half-retraction. The two 1 1/16-inch cylinders 66 overpower the 1⅛-inch cylinder 68, and so hold the 1⅛-inch cylinder 68 in half-retraction. The To drive the bumper plate 162 to the distal position 302, the 1⅛- cylinder 68 is charged in the reverse direction, and is thus driven to full extension or at least extend until the bumper plate 162 is stopped against the distal rubber stop 166. To drive the bumper plate 162 from the distal position 302 to the normal position 300, the 1⅛- cylinder 68 is reversed again, and so retracts the bumper plate 162 until the stops 163 on the bumper plate 162 stop against the pads 158 of the 1 1/16-inch cylinders 66. To drive the bumper plate 162 from the normal position 300 to the proximal position 304, the 1 1/16-inch cylinders 66 are allowed to vent, and so permit the 1⅛- cylinder 68 to retract until the bumper plate 162 stops against the proximal rubber stop 164. To drive the bumper plate 162 from the proximal position 304 to the normal position 300, the 1 1/16-inch cylinders 66 are powered once more to full extension, overpowering the 1⅛- cylinder 68 along the way. FIGS. 17 and 18 show how translatory changes of position in the rod 62b cause angular changes of position in the turntables 182. FIG. 17 shows the alignment of the turntable 182 when the bumper plate 162 is in the normal position 300. FIG. 17 also shows the alignment of the roller 36b, shown in broken lines. FIG. 18 shows the alignment of the turntable 182 when the bumper plate 162 is driven to the proximal position 304. FIG. 18 also shows that the key 214 has rotated relative to the position shown in FIG. 17, as illustrated by the orientation of the rectangular head 216. Further, the rectangular head 216 has slidably changed positions relative to the rectangular keyway 210 by moving radially outward, as relative to the position shown in FIG. 17. The pivoting of the turntable 182 causes the like pivoting of the roller 36b, as shown in FIG. 18 in broken lines.

While the roller 36b is pivoted, as shown in FIG. 18, the roller 36b remains positively driven as before. As previously indicated, the power is supplied to the roller 36b by the elastomeric rounded belting band 128b. The elastomeric rounded belting band 128b has resiliency for transferring power even while stretched or twisted as when the roller 36b is pivoted as shown.

FIG. 1 shows the rollers 36c, 36d, 36e, and 36f of the third, fourth, fifth and sixth transverse rows pivoted. The transverse rods 62c, 62d, 62e, and 62f are shifted to cause such pivoting. As said, the operation of a single link plate 78 correspondingly operates two adjacent rows of rollers 36. The correspondence of one link plate 78 with two transverse rows is disclosed for illustrative purposes only and is not intended to be limiting. It would be well within the means of one ordinarily skilled in the art to change that correspondence from 1:2 to a different correspondence such as 1:1 or 1:3 or the like.

The photodetectors 46 and 48 transmit information permitting the controller 44 to determine which article A in a cycle of four articles A is currently being supplied to the diverter apparatus 30. The controller apparatus A 44 responsively selects an appropriate sharp-angled zig-zag path for that article A. In addition, the photodetectors 46 and 48 in conjunction with the shaft encoder 130 (FIG. 5) transmit information permitting the controller 44 to compute the progressive position of that article A across the array of rollers 36. Ultimately, the controller 44 precisely times the triggering of the electrically operated air valves 84, for pivoting the rollers 36.

The precise time when the rollers 36 are pivoted relative to an article A is important for achieving sharp-angled zig-zag paths for the articles A. That is, the controller 44 must pivot each roller 36 to be aligned with the line of travel of the oncoming article A. For example, if the article A is moving longitudinally straight, the rollers 36 will have been pivoted to positions corresponding to the normal position 300 of the bumper plate 162. If the article A is being diverted transversely to the right (left to right in FIGS. 1 and 3 is top to bottom), the rollers 36 meet the oncoming article A head-on only after having been pivoted to the right. FIG. 18 illustrates a representative roller 36 pivoted to the left. FIG. 9 illustrates the bumper plate 162 driven to the proximal position 304, which is the position for the bumper plate 162 that corresponds to a roller 36 pivoted to the left (FIG. 18). Accordingly, a roller 36 pivoted to the left is also said to be pivoted to the proximal position 304 (FIGS. 9 and 18).

The time for pivoting the rollers 36 for steering the articles A is during the time when the rollers 36 that do the steering are in rolling contact with the articles A. In contrast, the time for pivoting the rollers 36 for conveying the articles A along a straight course is sometime progressively ahead of the arrival of the articles A. Pivoting the rollers 36 when articles A are in contact causes the articles A to change directions at sharp angles, rather than arcing curves, consequently achieving greater accuracy for placing the articles A in selected lanes. Another consequence of pivoting the rollers 36 when the articles A are in contact is that the articles A are not noticeably turned, but are merely traversed. In other words, the leading edges of the traversing articles A always face nearly directly forward, not noticeably deviating angularly therefrom. Thus, the articles are diverted, not in serpentine S-curves, but sharp-angled zig-zag paths, but without changing the directly forward orientation of the articles A.

Once each article A passes over transverse rows of rollers 36, the controller 44 reselects a new position for those rollers 36 for the oncoming trailing article A. Thus, while the transverse rows of rollers 36 may be longitudinally spaced apart by about 3.5 inches (as measured longitudinally between pivoting center lines), and because two transverse rows are pivoted in tandem, a trailing article A can follow a leading article A with as little as six inches therebetween.

An example of the foregoing begins with the supply of an article A to the first transverse row of rollers 36a and ends with the last transverse row of rollers 36l supplying the article A to the right outside lane (bottom lane as viewed in FIG. 1) of the downstream conveyor C. Thus, the article A is supplied to the first row of rollers 36a while the rollers of the first two rows 36a and 36b are held in the normal position 300 (FIGS. 9 and 17). During this segment of the path of the article A, the center of the article A travels linearly along the projection line 310 which is a continuation of the centerline of the lane of the articles A on the upstream conveyor B. The article A continues such linear travel along the projection line 310 and onto the second and third rows of rollers 36b and 36c. During such travel the leading edge of the article A will break the line of light 312 between the second photodetector 48 and the reflector 52. The controller 44 responds by selecting several rows of rollers for pivoting to the distal position 302 (FIGS. 9 and 18). Yet time elapses between when the leading edge of the article A breaks the line of light 312 and the instant the rollers actually pivot. During that elapse of time, the article A continues to move forwardly, with its center still traveling linearly along projection line 310, until the selected rows of rollers do responsively pivot.

According to this example, the selected rows of rollers pivot when the center of the article A is right at the intersection 314. Intersection 314 is the intersection between the above-mentioned projection line 310 and a projection line 316. At the moment that the center of the article A is at the intersection 314, the article covers some of the rollers of the second, third and fourth rows 36b, 36c, and 36d. At that moment, the controller 44 causes the selected first, second, third, and fourth rows 36a, 36b, 36c, and 36d to pivot.

The acute angle between the projection line 310 and the projection line 316 is about 30 degrees, which corresponds to the angular difference 6f position between a roller in the normal position 300 (FIGS. 9 and 17) and a roller in the proximal position (FIGS. 9 and 18). The direction of travel for the article A changes accordingly upon pivoting of the roller rows 36a, 36b, 36c, and 36d. The article A does not rotate but it will be diverted along a new path centered along the projection line 316. The controller 44 now pivots every two rows of rollers just ahead of the oncoming article A, so that the rollers of those rows meet the line of travel of the article A "head-on". To do that, the controller 44 monitors the progression of the article A after crossing the line of light 312, which the controller 44 is able to do by monitoring the output of the shaft encoder 130 (FIGS. 5 and 7). In this example so far, the two rows presently in front of the oncoming article A are the fifth and sixth rows 36e and 36f. Before the leading edge of the article A reaches them, the controller 44 pivots the rollers of the fifth and sixth rows 36e and 36f to meet the line of travel of the article A (that is, along the projection line 316) "head-on" (that is, pivoted to the distal position 302 shown in FIGS. 9 and 18). By doing so, the controller 44 prepares the path for the article A for being conveyed across the rows of rollers 36e and 36f in the prescribed direction. As the leading edge of the article A proceeds over the fifth and sixth rows 36e and 36f, its trailing edge eventually leaves the second row 36b. The controller 44 detects that event, again by monitoring the shaft encoder 130 (FIG. 5) and thus computing the progression of the article A across the diverter apparatus 30, and responds by pivoting the rollers of the first and second rows 36a and 36b to the normal position 300 (FIGS. 9 and 17).

For a while, the center of the article A travels linearly across the diverter apparatus 30 along the projection line 316 during which the leading edge of the article A moves across the fifth and sixth rows 36e and 36f. At that time, the leading edge is approaching the seventh and eighth rows 36g and 36h ahead of the fifth and sixth rows 36e and 36f. Accordingly, the controller 44 pivots the rows 36g and 36h to meet the line of travel of the article A (as along projection line 316) "head-on" (which means, pivoted to the distal position 302 as shown in FIGS. 9 and 18). Similar events take place with respect to the trailing edge of the article A. As the trailing edge leaves the fourth row of rollers 36d, the controller pivots the third and fourth rows 36c and 36d to the normal position 300 (FIGS. 9 and 17).

In similar fashion, as the article A moves further along the projection line 316, the rows 36i and 36j are pivoted to the distal position 302 and the rows 36e and 36f are pivoted to the normal position. The article A continues on the path of the line 316 until its center reaches the intersection 318.

The intersection 318 is an intersection between the above-mentioned projection line 316 and a projection line 320. The projection line 320 is parallel to the projection line 310, and is the centerline of the right outside lane of articles A on the downstream conveyor C. The obtuse angle between the projection line 316 and the projection line 320 is about 150 degrees, which corresponds to the angular difference of position between a roller in the distal position (FIGS. 9 and 18) and a roller in the normal position (FIGS. 9 and 17). At the moment the center of the article A is at the intersection 318, the article A covers some of the rollers of the eighth, ninth, and tenth rows 36h, 36i, and 36j. In accordance with that position, the controller 44 at that time would be holding the rollers of the seventh and eighth, ninth and tenth, and eleventh and twelfth rows 36g, 36h, 36i, 36j, 36k, and 36l in the distal position 304 (FIGS. 9 and 18). The moment the center of gravity of the article A is at the intersection 318 is the moment for the controller 44 to pivot all of the rollers of those rows 36g, 36h, 36i, 36j, 36k, and 36l to the normal position 300 (FIGS. 9 and 17). The article A accordingly begins linear travel along the projection line 320, and does so until the article A leaves the last row of rollers 36l of the diverter apparatus 30, onto the downstream conveyor C in the right outside lane.

The articles A are diverted for the other three lanes in a like manner. For the inside two lanes, the controller 44 permits the articles A to be conveyed along the projection line 310 to the intersection 322 before steering the articles toward either of the inside lanes. Consequently, the wear and tear is distributed more evenly among the rollers and mechanisms of this diverter apparatus 30.

This diverter apparatus 30 is shown to convey articles A longitudinally straight, or divert them left or right at an angle of about 30° from longitudinally straight. However, with adaptations easily made by one ordinarily skilled in the art, this diverter assembly 30 could be adapted to divert articles at angles of 45° or at other angles. Expanding the diverting angle consequently shortens the longitudinal run needed to divert the articles A to their proper lanes, thereby enabling the elimination of some of the last transverse rows of rollers 36, thus making a more compact and hence less expensive diverter assembly 30.

For steering accuracy, the controller 44 operates the pneumatic actuators 66 and 68 so as to eliminate recoil. Referring to FIG. 9, an example of when recoil would be experienced can be understood to occur at the time when the 1⅛- cylinder 68 would be operated to drive the bumper plate 162 to the distal position 302. Merely supplying the 1⅛- cylinder 68 with pneumatic power causes the piston rod 150 to accelerate for the full extension thereof until such acceleration would be mechanically stopped by the bumper plate 162 banging against the distal rubber stop 166. When the bumper plate 162 would bang against the distal rubber stop 166, the bumper plate 162 would bounce back in recoil. Recoil would be most severe for transverse rows having the most rollers. The problem created by recoil also would be greater in communication with position changes from either of the off-normal positions 302 or 304 to the normal position 300.

Recoil would adversely affect steering accuracy, and was sure to reduce the longevity of such close fitting parts as the fit between the keyway 210 and the head 216 of the key 214 (FIG. 18), and the fit between the bushing 192 and shaft 180 (FIG. 14). The problem of recoil was solved by decelerating the piston rod 150, which is done by the controller 44 controlling of the delivery of pneumatic power to the pneumatic actuators 66 and 68.

For the example given, the bumper plate 162 is driven from the normal position 300 to the distal position 302 by the controller 44 powering the 1⅛-cylinder 68 to extend for a preselected number of counted moments, followed by a period of much fewer counted moments of powering the 1⅛- cylinder 68 to retract, to be followed at last by powering extension once again. Such retro-powering decelerates the piston rod 150, thus braking its travel as it approaches its travel limit, rather than actually powering the rod to reciprocate for a short pulse.

Such deceleration is accomplished similarly for driving the bumper plate 162 from the proximal position 304 to the normal position 300 by venting the 1 1/16-inch cylinders 56 during the deceleration cycle. Consequently, this diverter assembly 30 pivots the rollers 36 as attain recoilless accuracy.

By all the means described above, this diverter assembly 30 provides high speed throughput and highly accurate lane diverting all while being designed for economy, including longevity and ruggedness for low maintenance operation.

While the present invention has been described by reference to a specific embodiment, it should be understood that modifications and variations of the invention may be constructed without departing from the scope of the invention defined in the following claims.

I claim:

1. An apparatus for supporting, conveying, and steering articles, the apparatus comprising;
    a plurality of axle support assemblies, each assembly comprising a generally vertical stem portion and a generally horizontal axle portion positioned above the stem portion;
    supporting-arranging means for supporting the axle support assemblies so each axle portion is pivotable about an axis disposed through the stem portion and for arranging the stem portions in an array which includes a plurality of transverse rows, with longitudinal spacing between adjacent rows and transverse spacing between adjacent stem portions of the same row;

rollers rotatably mounted on the axle portions, the rollers providing rolling surfaces upon which the articles can be supported and conveyed;

driving means powered by a power source for positively driving at least some of the rollers;

a plurality of row-pivoting means each corresponding to a predetermined transverse row or rows of stem portions, each row-pivoting means having means for pivoting the axle portions associated with the stem portions of said predetermined row or rows through a range of angular positions; and detector-selector means for detecting the infeed of the articles onto the rollers and selectively activating the row-pivoting means to steer the articles along prescribed paths;

each axle support assembly further comprises a slotted link portion below and fixed relative to the axle portion; and each row-pivoting means comprises a transverse rod extending past the slotted link portions of the axle support assemblies of that row, and being supported for translatory motion; each row-pivoting means further comprises a plurality of pins for interengaging the plurality of slotted link portions of that row with the rod so that translatory changes of position in the rod cause angular changes of position in the axle portions of the axle support assemblies of that row.

2. The apparatus of claim 1 wherein:

each axle support assembly further comprises an upright shaft that has a top end and a bottom end, a bracket mounted on the top end of the shaft and pivotable relative to an axis disposed through the shaft, and an axle horizontally mounted on the bracket.

3. The apparatus of claim 1, wherein:

each row-pivoting means comprises a couple movable for translatory motion, and linking means for linking each axle support assembly of that row and responding to movement in the couple such that translatory changes of position in the couple cause angular changes of position in the axle portions of the axle support assemblies of that row.

4. The apparatus of claim 1 wherein:

the range of angular positions for the stem portions includes a normal position for the rollers, and at least plus and minus thirty degrees of angular changes of position in the rollers from the normal position.

5. Apparatus for supporting, conveying, and steering articles comprising:

a plurality of generally upright shafts, each shaft having a top end and a bottom end;

supporting-arranging means for supporting the shafts and arranging the top ends in a transverse row, with transverse spacing between adjacent shafts;

a bracket mounted on the top end of the shaft, and pivotable about an axis disposed through said shaft;

an axle horizontally mounted on each bracket;

rollers rotatably mounted on the axles for supporting and conveying articles, the rollers having ring portions;

a transverse drive shaft powered by a power source and spaced below the axles, the transverse drive shaft having a plurality of ring portions which are transversely spaced in alignment with the ring portions of the rollers;

a transverse rod supported for translatory movement, the rod extending past and linking each bracket so translatory changes of position in the rod cause angular changes of position of the brackets;

impelling means for impelling translatory changes of position of the rod, thereby pivoting the rollers through a range of angular positions for steering the articles;

flexible, endless bands for transmitting power between the ring portions of the drive shaft and the ring portions of the rollers; the endless bands having resiliency for transmitting power even while stretched or twisted in response to pivoting of the rollers; and the endless bands define central openings while transmitting power, and portions of the supporting-arranging means are fixedly passed through those openings without interfering with the transmission of power by the endless bands.

6. The apparatus of claim 5 wherein:

the supporting-arranging means comprises a frame and a transverse bar rigidly supported by the frame.

7. The apparatus of claim 5 wherein:

the range of angular positions for the rollers includes a normal position, and at least about thirty degrees of angular changes of position int eh rollers from the normal position.

8. The apparatus of claim 5 wherein:

the impelling means provides for the selection of predetermined angular positions as partly predetermined by mechanical stops; the predetermined positions including at least a normal position and opposite off-normal positions on either side of the normal position.

9. An apparatus for supporting, conveying, and diverting a lane of successive articles to supply at least two lanes; the apparatus comprising:

an array of rollers providing rolling surfaces upon which the articles can be supported and conveyed;

supporting-arranging means for supporting each roller to rotate about a first axis and pivot about a second axis and for arranging the rollers by arranging the second axes in a plurality of transverse rows, with longitudinal spacing between adjacent rows and transverse spacing between adjacent rollers of the same row;

driving means powered by a power source for positively driving the rollers;

row-pivoting means for each transverse row of rollers for pivoting the rollers of that row through a range of angular positions; and detector-preparator-selector means for operating the row-pivoting means and thereby steer the articles across the array of rollers along prescribed sharp-angled paths, by detecting the infeed of articles onto the array of rollers and then monitoring the progressive positions of the articles along the array of rollers, by pivoting each roller head-on relative to the line of travel of each oncoming article, and by selecting rows of rollers at selected instants when a selected article is concurrently in rolling contact with the rolling surfaces of some of the rollers of those selected rows for pivoting the rollers of those selected rows from one position to another position as to attain recoilless accuracy.

10. The apparatus of claim 9 wherein:

said apparatus diverts a succession of articles supplied in a single lane to supply at least two lanes that are closely spaced together and are generally as transversely wide as the articles.

11. The apparatus of claim 10 wherein:

said apparatus supplies at least two lanes of articles so that the articles can be bunched in successive rows of at least two articles.

12. The apparatus of claim 9 wherein:

the rollers are made of material for providing the rollers with suitable traction on the articles.

13. The apparatus of claim 9 wherein:

each second axis generally intersects the associated roller's center of gravity.

14. The apparatus of claim 9 wherein:

the angular positions for the rollers includes a normal position and off-normal positions on both sides of the normal position.

15. The apparatus of claim 14 wherein:

the range of angular positions for the rollers includes at least plus and minus thirty degrees of changes of angular positions in the rollers from the normal position.

16. The apparatus of claim 9 wherein:

the impelling means provides for the selection of predetermined angular positions as partly predetermined by mechanical stops; the predetermined positions including at least a normal position and opposite off-normal positions on either side of the normal position.

17. The apparatus of claim 16 wherein:

each row-pivoting means comprises a couple movable for translatory motion, and linking means for linking each roller of that row and responding to movement in the couple such that translatory changes of position in the couple cause angular changes of position in the rollers of that row.

18. The apparatus of claim 17 wherein:

the detector-preparator-selector means includes a bidirectional impeller means for selectively impelling the couples of the row-pivoting means.

19. The apparatus of claim 18 wherein:

the detector-preparator-selector means partly attains recoilless accuracy by operating the impeller means with pulses which begin the selected couple to accelerate, and then decelerate as the selected couple approaches the respective limit of travel as limited by the respective mechanical stop; and partly by fixing cushioning material to the mechanical stops.

20. The apparatus of claim 9 wherein:

said apparatus steers the articles along sharp-angled zig-zag paths.

21. The apparatus of claim 9 wherein:

the array of rollers has an entrance end and an opposite exit end; and an elongated cylinder which is mounted rotatably, extends transversely, and spaced longitudinally from the entrance end; the elongated cylinder being driven by the driving means and having adjustable means for adjusting the elevation of the elongated cylinder relative to the array of rollers.

22. A method of supporting, conveying, and diverting a lane of successive articles to supply at least two lanes; the method comprising the steps providing rollers that have rolling surfaces upon which the articles can be supported and conveyed;

supporting each roller to rotate about a first axis and pivot about a second axis;

arranging the rollers by arranging the second axes in a plurality of transverse rows, with longitudinal spacing between adjacent rows and transverse spacing between adjacent rollers of the same row;

powering a driving means for positively driving the rollers;

detecting the infeed of articles onto the array of rollers and then monitoring the progressive positions of the article along the array of rollers;

pivoting each roller head-on relative to the line of travel of each oncoming article; and selecting rows of rollers at selected instants when a selected article is concurrently in rolling contact with the rolling surfaces of some of the rollers of those selected rows for pivoting the rollers of those selected rows from one position to another position as to attain recoilless accuracy, thereby steering the articles across the array of rollers along prescribed sharp-angled paths.

* * * * *